(12) United States Patent
Kawasaki

(10) Patent No.: US 8,746,189 B2
(45) Date of Patent: Jun. 10, 2014

(54) CONTROL SYSTEM OF INTERNAL COMBUSTION ENGINE

(75) Inventor: Takashi Kawasaki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 267 days.

(21) Appl. No.: 13/130,608

(22) PCT Filed: Nov. 25, 2008

(86) PCT No.: PCT/JP2008/071755
§ 371 (c)(1),
(2), (4) Date: May 25, 2011

(87) PCT Pub. No.: WO2010/061484
PCT Pub. Date: Jun. 3, 2010

(65) Prior Publication Data
US 2011/0253108 A1    Oct. 20, 2011

(51) Int. Cl.
*F02B 75/04* (2006.01)
*F01L 1/34* (2006.01)

(52) U.S. Cl.
USPC .................. 123/48 R; 123/78 R; 123/90.15

(58) Field of Classification Search
USPC ............ 123/48 R, 78 R, 48 C, 78 C, 406.76, 123/90.15, 73 AC
See application file for complete search history.

(56) References Cited

U.S. PATENT DOCUMENTS

| | | | |
|---|---|---|---|
| 4,834,031 A | 5/1989 | Katoh et al. | |
| 7,661,407 B2 * | 2/2010 | Yasui et al. | 123/406.35 |
| 7,802,543 B2 * | 9/2010 | Akihisa et al. | 123/48 R |
| 2004/0189323 A1 | 9/2004 | Nagase | |
| 2005/0273245 A1 * | 12/2005 | Chen et al. | 701/111 |
| 2011/0005497 A1 * | 1/2011 | Irisawa | 123/48 R |

FOREIGN PATENT DOCUMENTS

| | | |
|---|---|---|
| JP | A-64-035047 | 2/1989 |
| JP | A-2004-169660 | 6/2004 |
| JP | A-2004-301670 | 10/2004 |
| JP | A-2005-214168 | 8/2005 |
| JP | A-2006-161583 | 6/2006 |
| JP | A-2007-177792 | 7/2007 |

OTHER PUBLICATIONS

International Search Report issued in International Application No. PCT/JP2008/071755 dated Feb. 3, 2009.

* cited by examiner

*Primary Examiner* — Rinaldi Rada
*Assistant Examiner* — Syed O Hasan
(74) *Attorney, Agent, or Firm* — Oliff PLC

(57) ABSTRACT

An internal combustion engine wherein a variable compression ratio mechanism which can change the mechanical compression ratio and a detection sensor for detecting the mechanical compression ratio are provided and wherein the mechanical compression ratio is controlled based on the mechanical compression ratio detected by the detection sensor. When a signal line of the detection sensor breaks, the mechanical compression ratio is lowered to the minimum mechanical compression ratio.

6 Claims, 14 Drawing Sheets

(A)  (B)

Fig.6
(A)
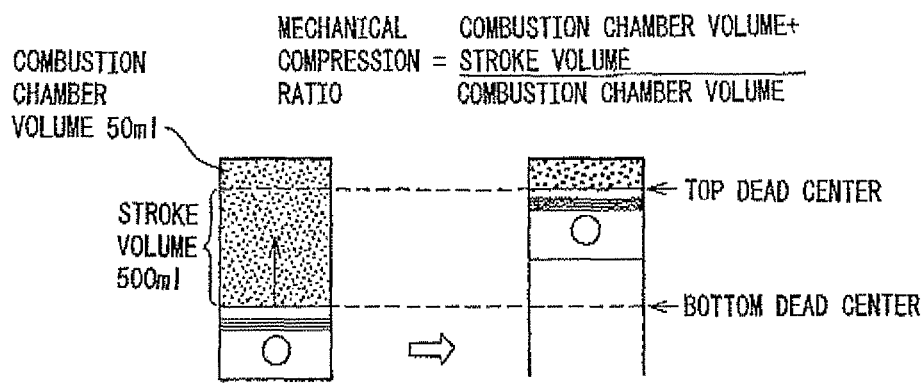
(B)
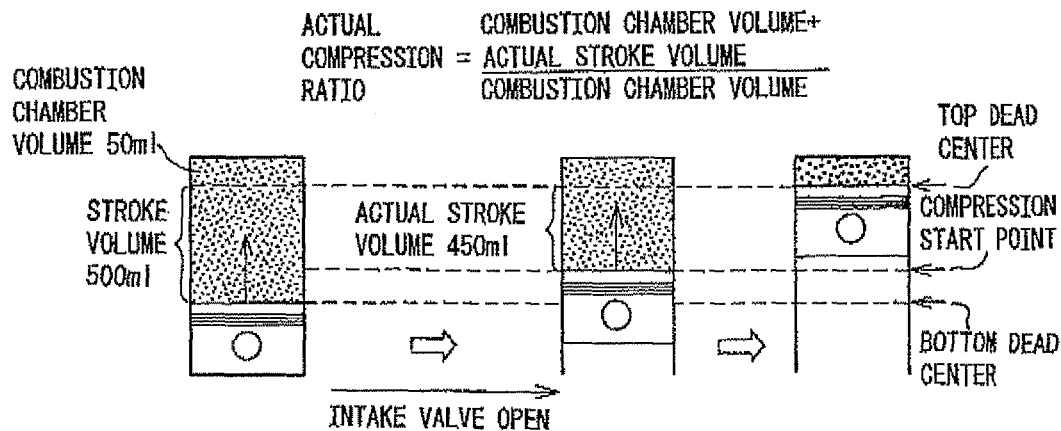
(C)
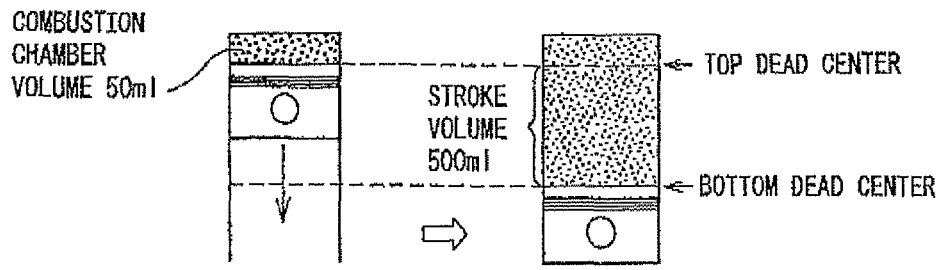

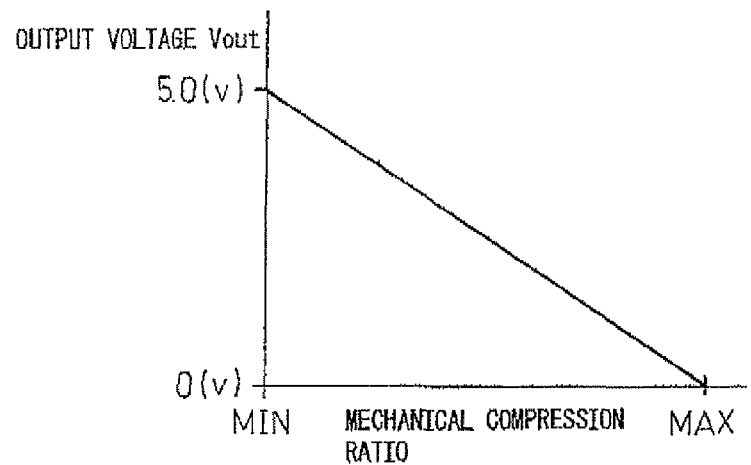
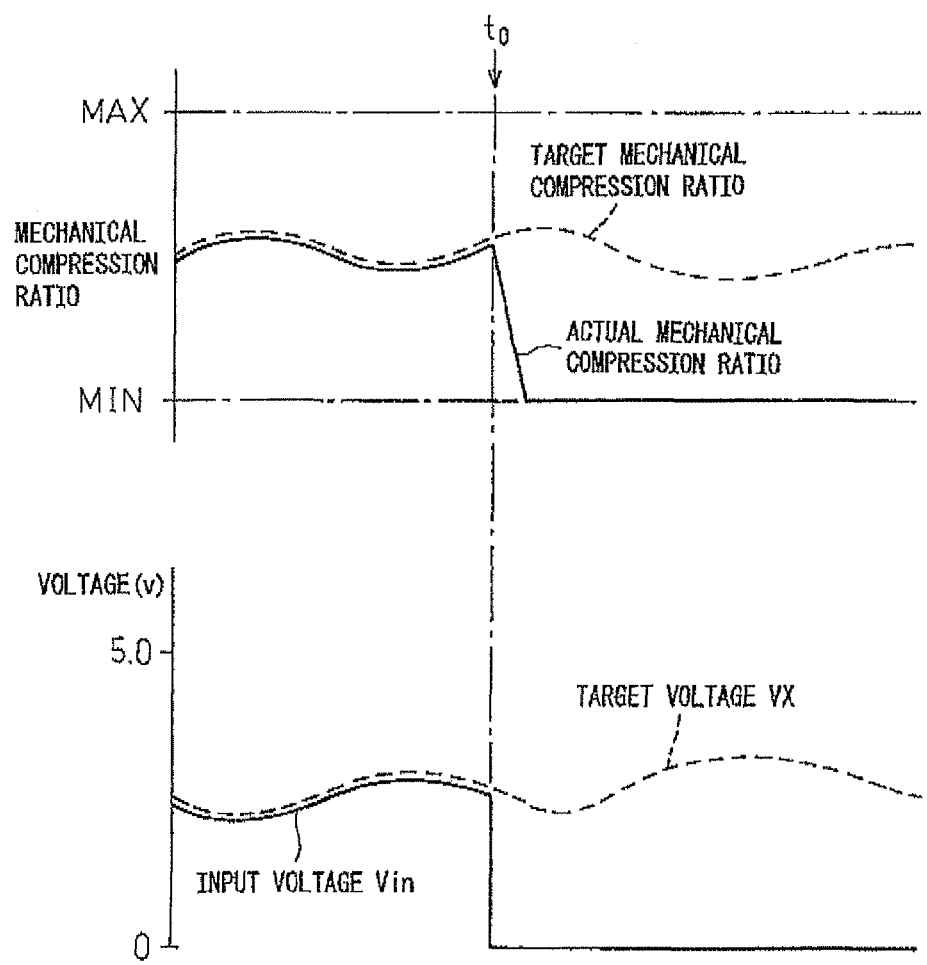

US 8,746,189 B2

CONTROL SYSTEM OF INTERNAL COMBUSTION ENGINE

TECHNICAL FIELD

The present invention relates to a control system of an internal combustion engine.

BACKGROUND ART

Known in the art is an internal combustion engine which is designed to be able to change a mechanical compression ratio by a variable compression ratio mechanism, which is provided with a detection sensor able to detect the mechanical compression ratio, and which uses an output signal of the detection sensor as the basis to control the mechanical compression ratio to a target compression ratio (see Japanese Patent Publication (A) No. 2006-161583). In this internal combustion engine, a mechanical compression ratio control system is employed whereby if a signal line which conveys the output signal of the detection sensor breaks, the mechanical compression ratio becomes a maximum mechanical compression ratio.

However, when the engine load is high, if the mechanical compression ratio is raised, a combustion end temperature in the combustion chamber will become higher and as a result problems will arise such as the occurrence of pre-ignition or knocking. Therefore, in the above-mentioned internal combustion engine, to suppress the occurrence of knocking when a break in the signal line causes the mechanical compression ratio to become the maximum mechanical compression ratio, the amount of intake air is reduced and the ignition timing is delayed. That is, the amount of intake air is reduced to prevent a high load operating state, while the ignition timing is delayed so as to suppress a rise in the combustion pressure.

In this regard, it may be possible to suppress the occurrence of knocking in this way by reducing the amount of intake air and delaying the ignition timing because the maximum mechanical compression ratio is not that high. However, if making the maximum mechanical compression ratio a further higher compression ratio, when the mechanical compression ratio is the maximum mechanical compression ratio, even if reducing the amount of intake air or delaying the ignition timing, it will become difficult to block the occurrence of knocking. That is, in this case, if a signal line breaks or another abnormality occurs, insofar as employing a mechanical compression ratio control system where the mechanical compression ratio becomes the maximum mechanical compression ratio, it will be difficult to prevent the occurrence of pre-ignition or knocking.

SUMMARY OF INVENTION

An object of the present invention is to provide a control system of an internal combustion engine which is designed to control a mechanical compression ratio so that pre-ignition and knocking do not occur when an abnormality arises in a detection device of the mechanical compression ratio.

According to the present invention, there is provided a control system of an internal combustion engine provided with a variable compression ratio mechanism able to change a mechanical compression ratio, the control system comprising a detection device for detecting the mechanical compression ratio and a compression ratio control device which controls the mechanical compression ratio on the basis of the mechanical compression ratio detected by the detection device, wherein when an abnormality occurs in the detection device, the mechanical compression ratio is lowered toward a minimum mechanical compression ratio.

BRIEF DESCRIPTION OF THE DRAWINGS

FIG. 6 is a view for explaining the engine compression ratio, actual compression ratio, and expansion ratio.

FIG. 17 is a view showing the relationship between the mechanical compression ratio and the output voltage of the detection sensor, FIG. 18 is a time chart for explaining the change of the actual mechanical compression ratio.

BEST MODE FOR CARRYING OUT THE INVENTION

Figure 1:
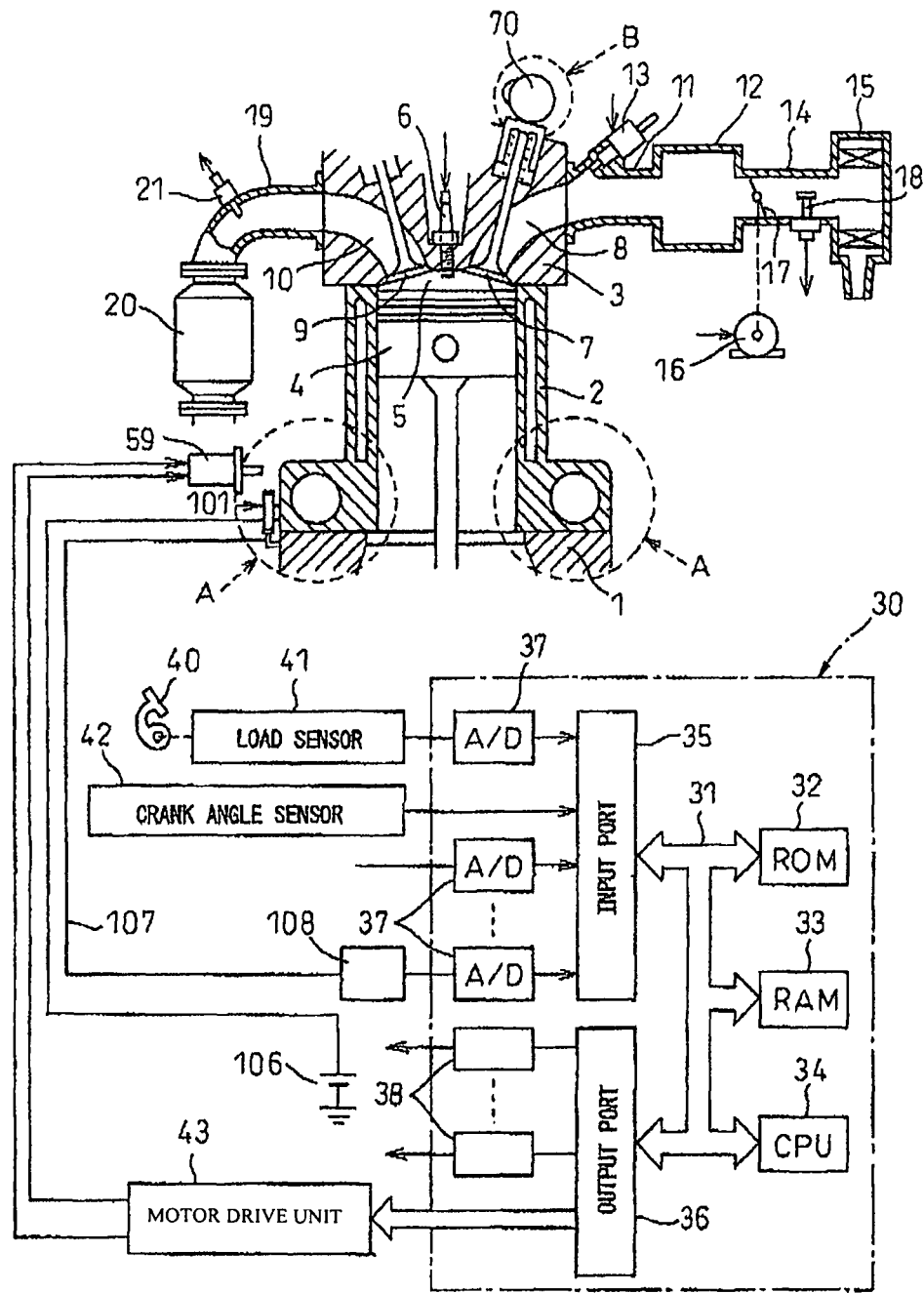
FIG. 1 is an overview of a spark ignition type internal combustion engine.

FIG. 1 shows a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port B. Note that each fuel injector 13 may be arranged at each combustion chamber 5 instead of being attached to each intake branch tube 11.

The surge tank 12 is connected through an intake duct 14 to an air cleaner 15, while the intake duct 14 is provided inside it with a throttle valve 17 driven by an actuator 16 and an intake air amount detector 18 using for example a hot wire. On the other hand, the exhaust port 10 is connected through an exhaust manifold 19 to a catalytic converter 20 housing for example a three-way catalyst, while the exhaust manifold 19 is provided inside it with an air-fuel ratio sensor 21.

On the other hand, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center, and there is further provided with an actual compression action start timing changing mechanism B able to change a start timing of an actual compression action. Note that in the embodiment shown in FIG. 1, this actual compression action start timing changing mechanism B is comprised of a variable valve timing mechanism able to control the closing timing of the intake valve 7.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 18 and the output signal of the air-fuel ratio sensor 21 are input through corresponding AD converters 37 to the input port 35. Further, the accelerator pedal 40 is connected to a load sensor 41 generating an output voltage proportional to the amount of depression L of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the drive circuit 38 to a spark plug 6, fuel injector 13, throttle valve drive actuator 16, variable compression ratio mechanism A, and variable valve timing mechanism B. The output port 36 also connects a motor drive unit 43 to a drive motor 59.

Figure 2:
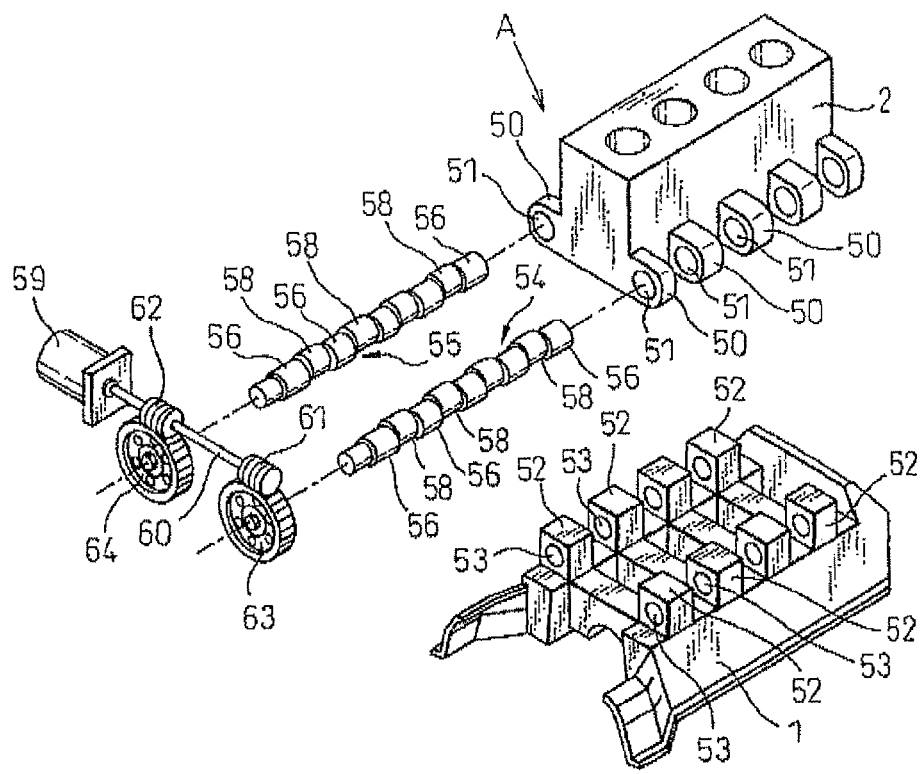
FIG. 2 is a disassembled perspective view of a variable compression ratio mechanism.
Figure 3:
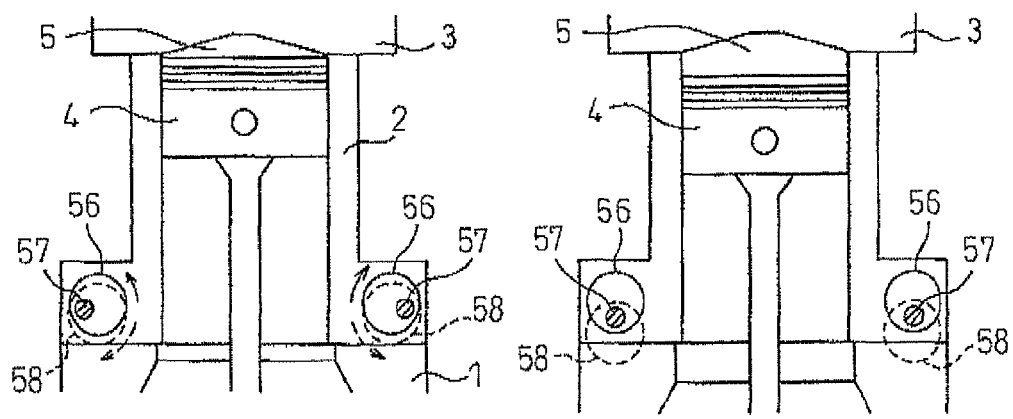
FIG. 3 is a side cross-sectional view of the illustrated internal combustion engine.

FIG. 2 is a disassembled perspective view of the variable compression ratio mechanism A shown in FIG. 1, while FIG. 3 is a side cross-sectional view of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed an it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3(A) from the state shown in FIG. 3(A), the eccentric shafts 57 move toward the bottom center, so the circular cams 58 rotate in the opposite directions from the circular cams 56 in the cam insertion holes 53 as shown by the broken line arrows in FIG. 3(A). As shown in FIG. 3(B), when the eccentric shafts 57 move toward the bottom center, the centers of the circular cams 58 move to below the eccentric shafts 57.

As will be understood from a comparison of FIG. 3(A) and FIG. 3(B), the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned as compression top dead center increases, therefore by making the cam shafts 54, 55 rotate, the volume of the combustion chamber 5 when the piston 4 is positioned as compression top dead center can be changed.

As shown in FIG. 2, to make the cam shafts 54, 55 rotate in opposite directions, the shaft 60 of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
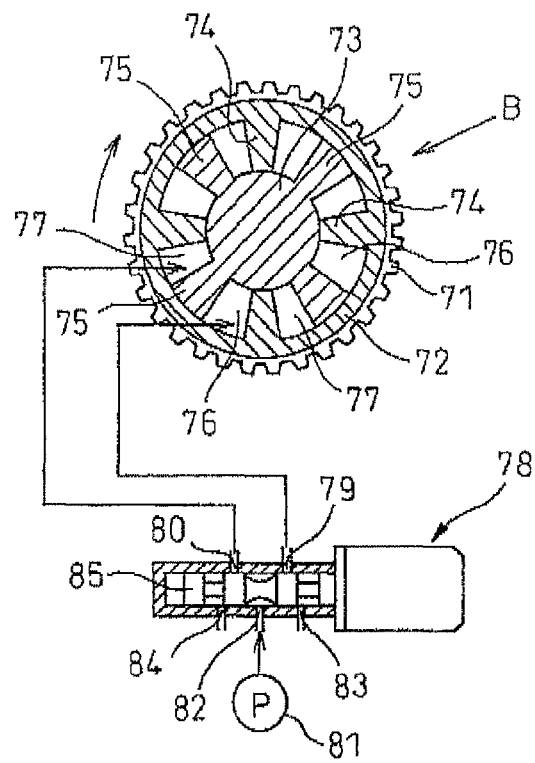
FIG. 4 is a view of a variable valve timing mechanism.

On the other hand, FIG. 4 shows a variable valve timing mechanism B attached to the end of the cam shaft 70 for driving the intake valve 7 in FIG. 1. Referring to FIG. 4, this variable valve timing mechanism B is provided with a timing pulley 71 rotated by an engine crank shaft through a timing belt in the arrow direction, a cylindrical housing 72 rotating together with the timing pulley 71, a shaft 73 able to rotate together with an intake valve drive cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with hydraulic chambers for advancing 76 and use hydraulic chambers for retarding 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84 and a spool valve 85 for controlling connection and disconnection of the ports 79, 80, 82, 83, 84.

To advance the phase of the cams of the intake valve drive cam shaft 70, in FIG. 4, the spool valve 85 is made to move to the right, working oil fed from the feed port 82 is fed through the hydraulic port 79 to the hydraulic chambers for advancing 76, and working oil in the hydraulic chambers for retarding 77 is drained from the drain port 84. At this time, the shaft 73 is made to rotate relative to the cylindrical housing 72 in the arrow direction.

As opposed to this, to retard the phase of the cams of the intake valve drive cam shaft 70, in FIG. 4, the spool valve 85 is made to move to the left, working oil fed from the feed port 82 is fed through the hydraulic port 80 to the hydraulic chambers for retarding 77, and working oil in the hydraulic chambers for advancing 76 is drained from the drain port 83. At this time, the shaft 73 is made to rotate relative to the cylindrical housing 72 in the direction opposite to the arrows.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the variable valve timing mechanism B so as to advance or retard the phase of the cams of the intake valve drive cam shaft 70 by exactly the desired amount.

Figure 5:
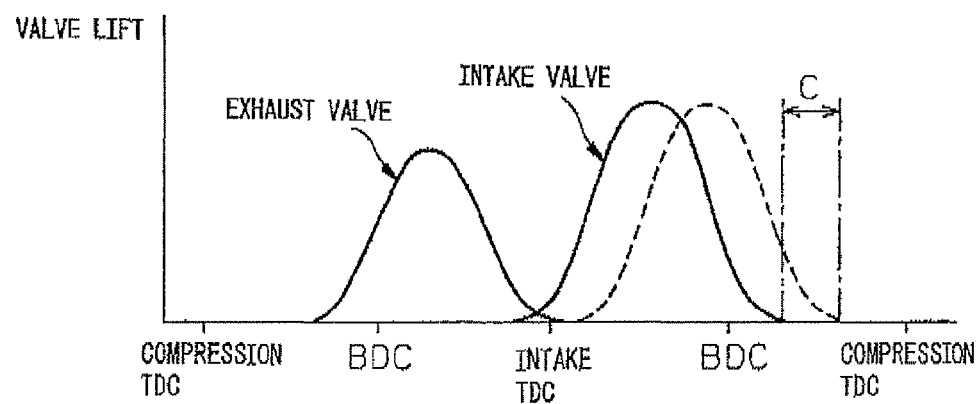
FIG. 5 is a view showing the amounts of lift of the intake valve and exhaust valve.

In FIG. 5, the solid line shows when the variable valve timing mechanism B is used to advance the phase of the cams of the intake valve drive cam shaft 70 the most, while the broken line shows when it is used to retard the phase of the cams of the intake valve drive cam shaft 70 the most. Therefore, the opening time of the intake valve 7 can be freely set between the range shown by the solid line in FIG. 5 and the range shown by the broken line, therefore the closing timing of the intake valve 7 can be set to any crank angle in the range shown by the arrow C in FIG. 5.

The variable valve timing mechanism B shown in FIG. 1 and FIG. 4 is one example. For example, a variable valve timing mechanism or other various types of variable valve timing mechanisms able to change only the closing timing of the intake valve while maintaining the opening timing of the intake valve constant can be used.

Next, the meaning of the terms used in the present application will be explained with reference to FIG. 6. Note that FIGS. 6(A), (B), and (C) show for explanatory purposes an engine with a volume of the combustion chambers of 50 ml and a stroke volume of the piston of 500 ml. In these FIGS. 6(A), (B), and (C), the combustion chamber volume shows the volume of the combustion chamber when the piston is at compression top dead center.

FIG. 6(A) explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6(A), this mechanical compression ratio becomes (50 ml+500 ml)/50 ml=11.

FIG. 6(B) explains the actual compression ratio. This actual compression ratio is a value determined from the actual stroke volume of the piston from when the compression action is actually started to when the piston reaches top dead center and the combustion chamber volume. This actual compression ratio is expressed by (combustion chamber volume+ actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual compression ratio is expressed as follows using the actual stroke volume. In the example shown in FIG. 6(B), the actual compression ratio becomes (50 ml+450 ml)/50 ml=10.

FIG. 6(C) explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6(C), this expansion ratio becomes (50 ml+500 ml)/50 ml=11.

Next, a superhigh expansion ratio cycle used in the present invention will be explained with reference to FIG. 7 and FIG. 8. Note that FIG. 7 shows the relationship between the theoretical thermal efficiency and the expansion ratio, while FIG. 8 shows a comparison between the ordinary cycle and superhigh expansion ratio cycle used selectively in accordance with the load in the present invention.

FIG. 8(A) shows the ordinary cycle when the intake valve closes near the bottom dead center and the compression action by the piston is started from near substantially compression bottom dead center. In the example shown in this FIG. 8(A) as well, in the same way as the examples shown in FIGS. 6(A), (B), and (C), the combustion chamber volume is made 50 ml, and the stroke volume of the piston is made 500 ml. As will be understood from FIG. 8(A), in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 7:
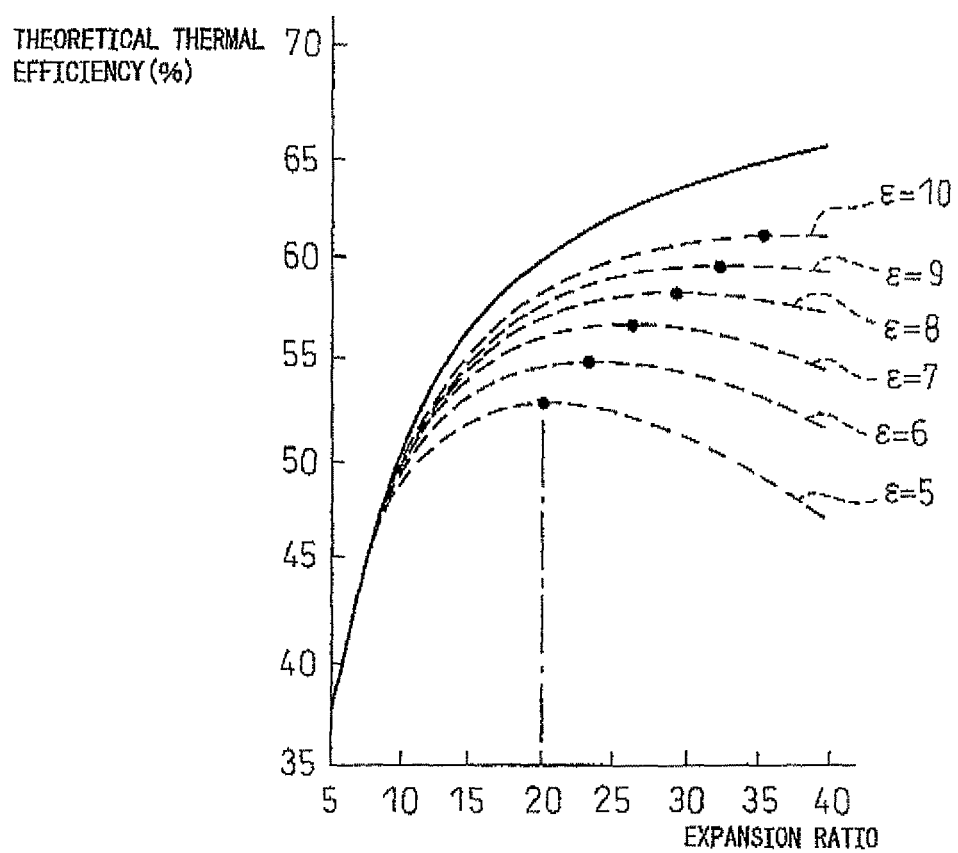
FIG. 7 is a view showing the relationship between the theoretical thermal efficiency and expansion ratio.
Figure 8:
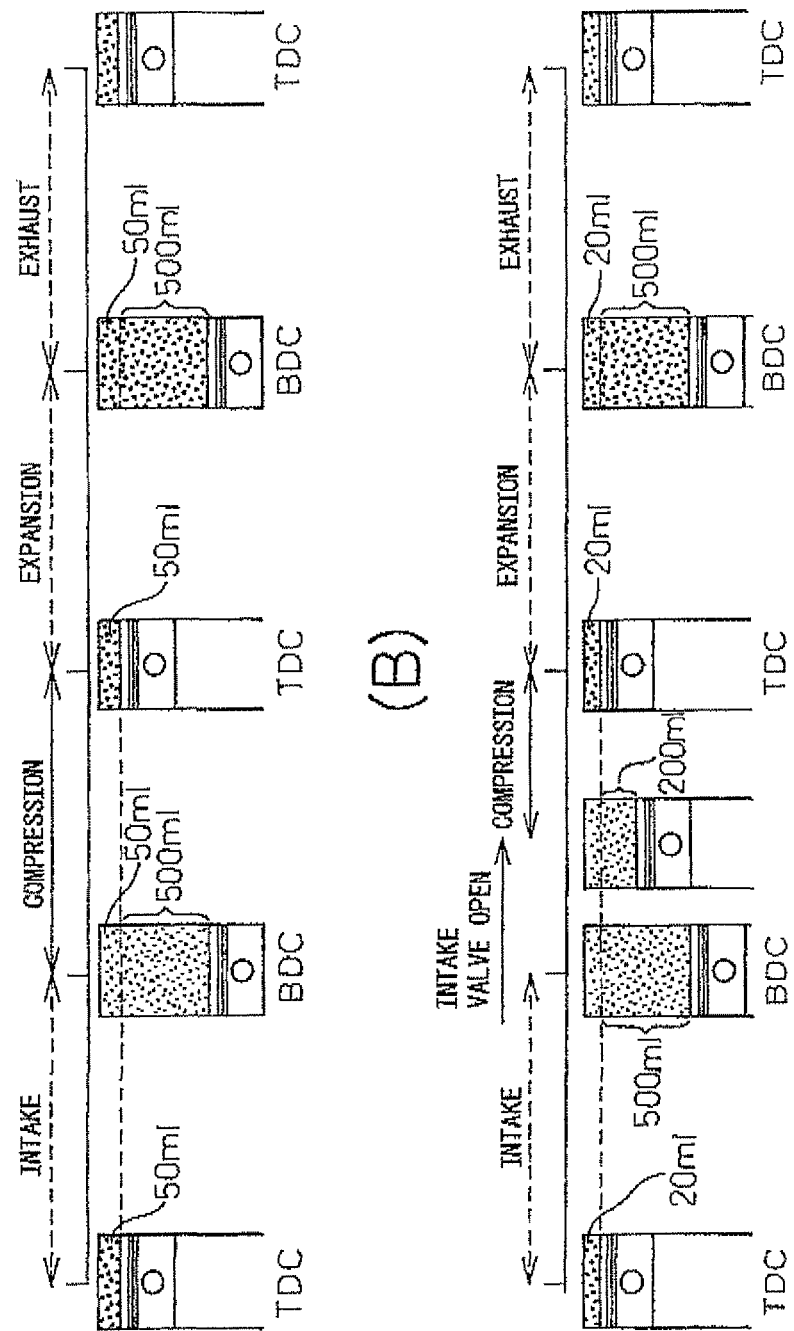
FIG. 8 is a view for explaining an ordinary cycle and superhigh expansion ratio cycle.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, in view of this situation, the mechanical compression ratio and actual compression ratio were strictly subdivided and raising the theoretical thermal efficiency was studied. As a result, it was discovered that in the theoretical thermal efficiency, the expansion ratio is dominant, while the actual compression ratio has almost no effect on the theoretical thermal efficiency. That is, if raising the actual compression ratio, the explosive force rises, but large energy becomes required for compression. Even if thus raising the actual compression ratio, the theoretical thermal efficiency does not rise much at all.

As opposed to this, if increasing the expansion ratio, at the time of the expansion stroke, the period during which a pushdown force acts on the piston will become longer and therefore the period during which the piston gives a rotational force to the crankshaft will become longer. Therefore, the larger the expansion ratio, the higher the theoretical thermal efficiency becomes. The broken lines in FIG. 7 show the theoretical thermal efficiency in the case of raising the expansion ratio in the state with the actual compression ratio $\epsilon$ fixed at 5, 6, 7, 8, 9, and 10. Note that, in FIG. 7, the black circles show the positions of the peaks of theoretical thermal efficiency when the actual compression ratio $\epsilon$ is made 5, 6, 7, 8, 9, and 10. From FIG. 7, it is learned that there is no major difference between the amount of rise of the theoretical thermal efficiency when raising the expansion ratio in the state of maintaining the actual compression ratio $\epsilon$ at for example the low value of 10 and the amount of rise of the theoretical thermal efficiency when the actual compression ratio shown by the solid line in FIG. 7 is also increased along with the expansion ratio.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 8(B) shows an example of the case when using the variable compression ratio mechanism A and variable valve timing mechanism B to maintain the actual compression ratio at a low value and raise the expansion ratio.

Referring to FIG. 8(B), in this example, the variable compression ratio mechanism A is used to lower the combustion chamber volume from 50 ml to 20 ml. On the other hand, the variable valve timing mechanism B is used to delay the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8(A), as explained above, the actual compression ratio is about 11 and the expansion ratio is 11. Compared with this case, in the case shown in FIG. 8(B), it is learned that only the expansion ratio is raised to 26. This is the reason that it is called the "superhigh expansion ratio cycle".

In an internal combustion engine, generally speaking, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8(B), the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8(B) is set, while at the time of engine high load operation, the ordinary cycle shown in FIG. 8(A) is set.

Next, typical operational control will be explained as a whole while referring to FIG. 9.

Figure 9:
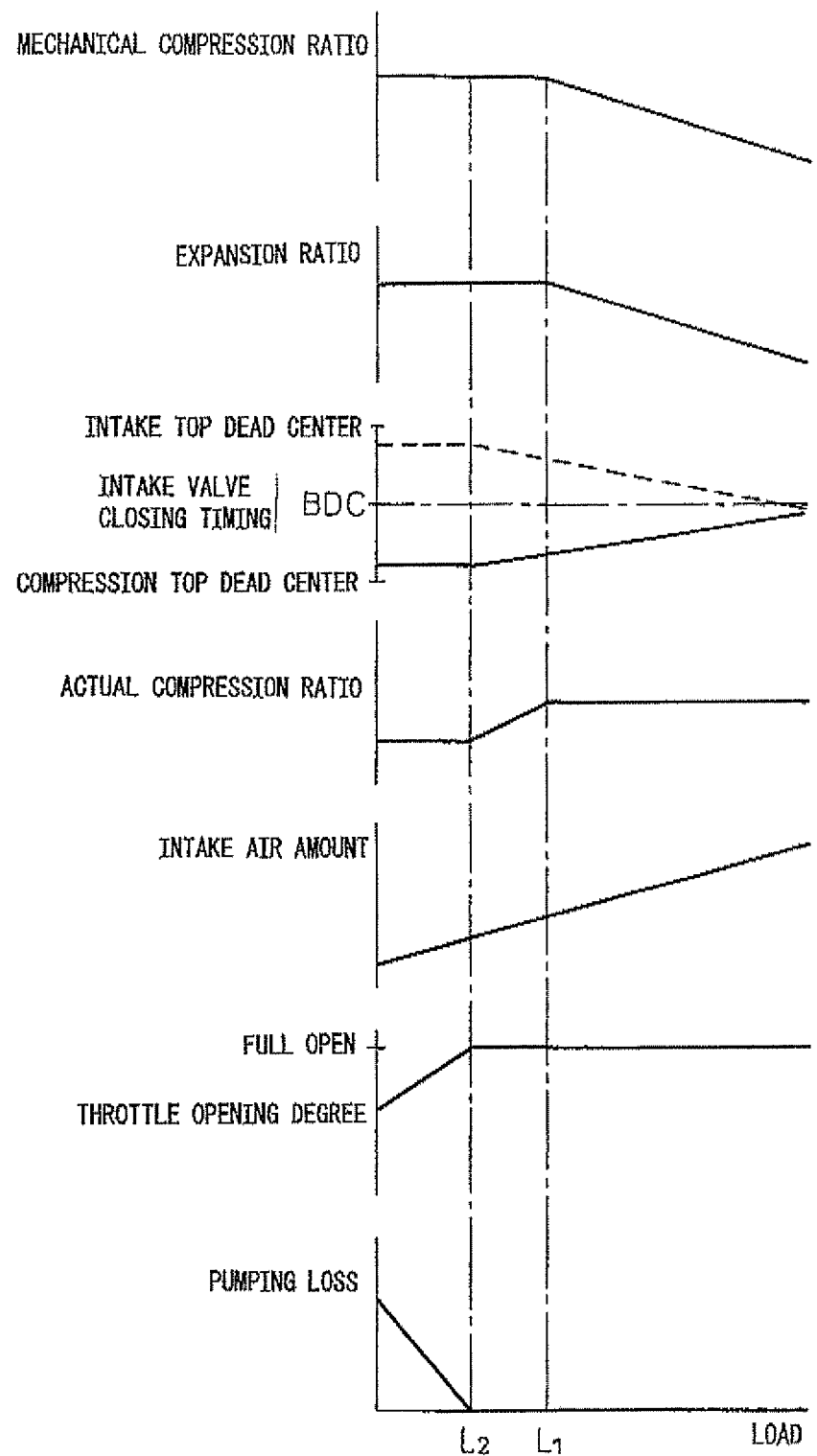
FIG. 9 is a view showing the change in mechanical compression ratio etc. in accordance with the engine load.

FIG. 9 shows the changes in the mechanical compression ratio, expansion ratio, closing timing of the intake valve 7, actual compression ratio, intake air amount, opening degree of the throttle valve 17, and pumping loss in accordance with the engine load at a certain engine speed. Note that, FIG. 9 shows the case where the mean air flow ratio in the combustion chamber 5 is feedback controlled to the stoichiometric air-fuel ratio based on the output signal of the air-fuel ratio sensor 21 so as to be able to simultaneously decrease the unburned HC, CO, and $NO_x$ in the exhaust gas by the three-way catalyst in the catalytic converter 20.

Now then, as explained above, at the time of engine high load operation, the ordinary cycle shown in FIG. 8(A) is performed. Therefore, as shown in FIG. 9, at this time, the mechanical compression ratio is made lower, so the expansion ratio is low and, as shown by the solid line in FIG. 9, the closing timing of the intake valve 7 is advanced as shown by the solid line in FIG. 5. Further, at this time, the amount of intake air is large. At this time, the opening degree of the throttle valve 17 is held at full opener substantially full open, so the pumping loss becomes zero.

On the other hand, as shown by the solid line in FIG. 9, if the engine load becomes low, along with this, the closing timing of the intake valve 7 is delayed so as to reduce the amount of intake air. Further, at this time, to enable the actual compression ratio to be held substantially constant, as shown in FIG. 9, as the engine load becomes lower, the mechanical compression ratio is increased. Therefore, as the engine load becomes lower, the expansion ratio is also increased. Note that, at this time as well, the throttle valve 17 is held in the full open or substantially full open state. Therefore, the amount of intake air which is fed into the combustion chamber 5 is controlled, without relying on the throttle valve 17, by changing the closing timing of the intake valve 7. At this time as well, the pumping loss becomes zero.

In this way, when the engine load becomes lower from the engine high load operation state, under a substantially constant actual compression ratio, the mechanical compression ratio is increased as the amount of intake air decreases. That is, the volume of each combustion chamber 5 when the piston 4 reaches compression top dead center is decreased proportionally to the decrease in the amount of intake air. Therefore, the volume of the combustion chamber 5 when the piston 4 reaches compression top dead center changes proportionally to the amount of intake air. Note that, at this time, in the example shown in FIG. 9, the air-fuel ratio in the combustion chamber 5 becomes the stoichiometric air-fuel ratio, so the volume of the combustion chamber 5 when the piston 4 reach compression top dead center changes proportionally to the amount of fuel.

If the engine load becomes further lower, the mechanical compression ratio is further increased. If the engine load falls to the medium load $L_1$ somewhat near low load, the mechanical compression ratio reaches the limit mechanical compression ratio which is the structural limit of the combustion chamber 5. If the mechanical compression ratio reaches the limit mechanical compression ratio, in the region of a load lower than the engine load $L_1$ where the mechanical compression ratio reaches the limit mechanical compression ratio, the mechanical compression ratio is held at the limit mechanical compression ratio. Therefore, at the time of engine medium load operation at the low load side and at the time of engine low load operation, that is, at the engine low load operation side, the mechanical compression ratio becomes maximum and the expansion ratio also becomes maximum. Expressed another way, at the engine low load operation side, the mechanical compression ratio is made the maximum so as to obtain the maximum expansion ratio.

On the other hand, in the embodiment shown in FIG. 9, even when the engine load becomes lower than $L_1$, as shown by the solid line in FIG. 9, the closing timing of the intake valve 7 is delayed as the engine load becomes lower. If the engine load falls to $L_2$, the closing timing of the intake valve 7 becomes the limit closing timing at which the amount of intake air which is fed into the combustion chamber 5 can be controlled. If the closing timing of the intake valve 7 reaches the limit closing timing, in the region of a load lower than the engine load $L_2$ when the closing timing of the intake valve 7 reaches the limit closing timing, the closing timing of the intake valve 7 is held at the limit closing timing.

If the closing timing of the intake valve 7 is held at the limit closing timing, the amount of intake air can no longer be controlled by the change of the closing timing of the intake valve 7. In the embodiment shown in FIG. 9, at this time, that is, in the region of a load lower than the engine load $L_2$ when the closing timing of the intake valve 7 reaches the limit closing timing, the amount of intake air which is fed into the combustion chamber 5 is controlled by the throttle valve 17. However, if the throttle valve 17 is used to control the amount of intake air, as shown in FIG. 9, the pumping loss increases.

On the other hand, as shown in FIG. 9, at the engine high load operation side where the engine load is higher than $L_1$, the actual compression ratio is held at substantially the same actual compression ratio for the same engine speed. As opposed to this, when the engine load is lower than $L_2$, that is, when the mechanical compression ratio is held at the limit mechanical compression ratio, the actual compression ratio is determined by the closing timing of the intake valve 7. If the closing timing of the intake valve 7 is delayed so that the engine load becomes between $L_1$ and $L_2$, the actual compression ratio falls. If the closing timing of the intake valve 7 is held at the limit closing timing like in the operating region where the engine load is lower than $L_2$, the actual compression ratio is held constant.

In this regard, in this embodiment according to the present invention, the expansion ratio in the superhigh expansion ratio cycle is made 26 to 30. On the other hand, in FIG. 7, the actual compression ratio $\epsilon=5$ shows the lower limit of the actual compression ratio able to be used in practice. In this case, when the expansion ratio is about 20, the theoretical thermal efficiency peaks. The expansion ratio where the stoichiometric fuel ratio peaks becomes higher than 20 as the actual compression ratio $\epsilon$ becomes larger than 5, therefore, if considering the actual compression ratio $\epsilon$ which has a possibility of being used in practice, it can be said that the expansion ratio is preferably 20 or more. Therefore, in this embodiment according to the present invention, the variable compression ratio mechanism A is formed so that the expansion ratio becomes 20 or more.

On the other hand, as shown by the broken line in FIG. 9, as the engine load becomes lower, even if advancing the closing timing of the intake valve 7, it is possible to control the amount of intake air without using the throttle valve 17. Therefore, if expressing this to cover both the case shown by the solid line and the case shown by the broken line in FIG. 9, in this embodiment according to the present invention, as the engine load becomes lower, the closing timing of the intake valve 7 is made to move in a direction away from intake bottom dead center BDC until the limit closing timing $L_2$ at which the amount of intake air which is fed to the combustion chamber can be controlled.

Now then, in this embodiment according to the present invention, a detection device for detecting the mechanical compression ratio is provided. The mechanical compression ratio is controlled to the target mechanical compression ratio on the basis of the mechanical compression ratio detected by this detection device. On the other hand, in this embodiment according to the present invention, as explained above, the variable compression ratio mechanism A is formed so that the expansion ratio becomes 20 or more, that is, the maximum mechanical compression ratio becomes a high compression ratio of 20 or more. In this way, when the maximum mechanical compression ratio is high, if an abnormality occurs in the detection device and the mechanical compression ratio is held at the maximum mechanical compression ratio, even if decreasing the amount of intake air or even if delaying the ignition timing, pre-ignition or knocking will end up occurring.

Therefore, in the present invention, when an abnormality arises in the detection device for detecting the mechanical compression ratio, the mechanical compression ratio is lowered toward the minimum mechanical compression ratio. If lowering the mechanical, compression ratio toward the minimum mechanical compression ratio in this way, compared to the case of the maximum mechanical compression ratio, the compression end temperature in the combustion chamber 2 falls and thus the occurrence of pre-ignition and knocking can be controlled.

Figure 10:
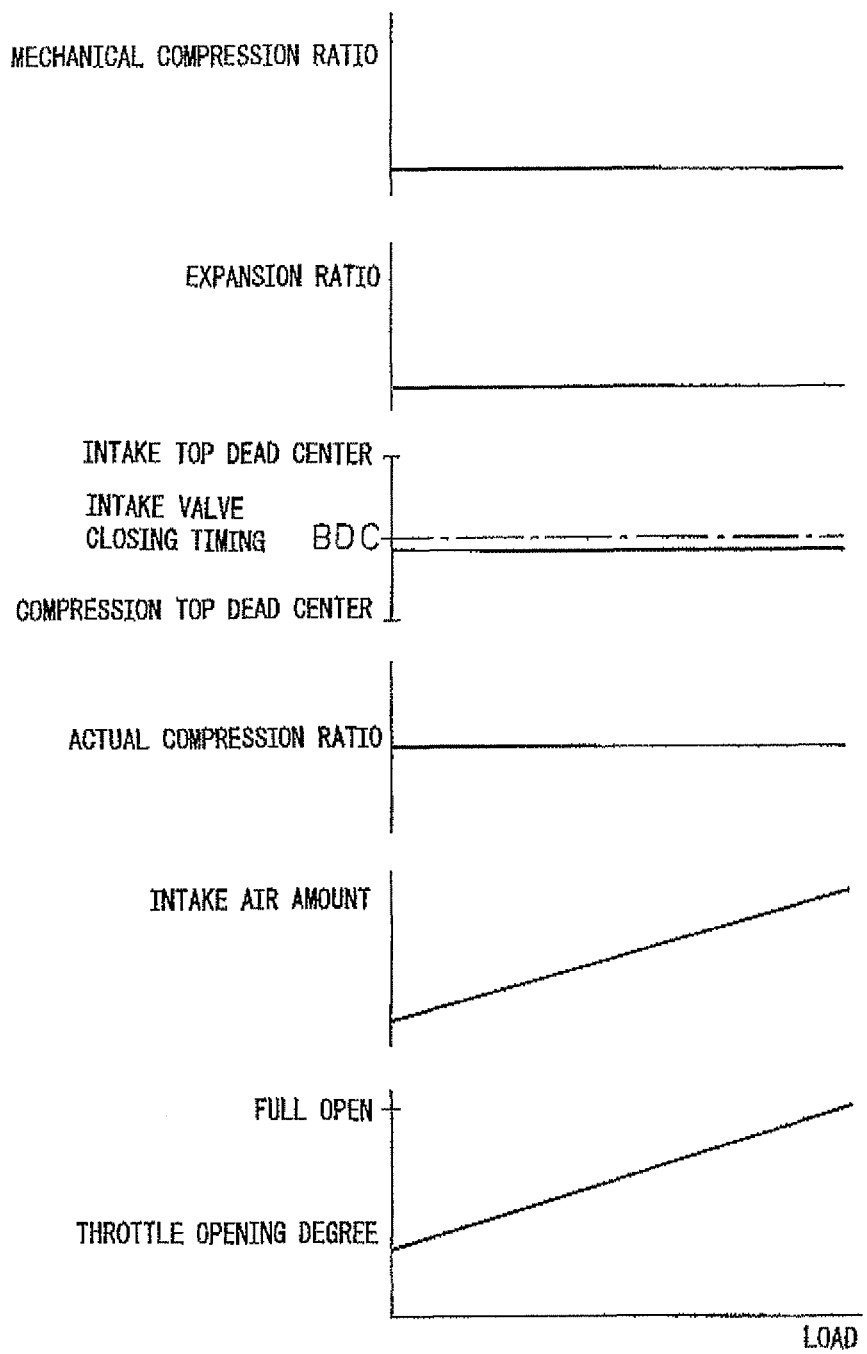
FIG. 10 is a view showing changes in a mechanical compression ratio etc. in accordance with the engine load.

In this case, if lowering the mechanical compression ratio to the minimum mechanical compression ratio, it is possible to further block the occurrence of pre-ignition or knocking. Therefore, in this embodiment according to the present invention, when, an abnormality occurs in the detection device for detecting the mechanical compression ratio, as shown in FIG. 10, the mechanical compression ratio is lowered to the minimum mechanical compression ratio regardless of the engine lead. At this time, the closing timing of the intake valve 7 is fixed to the closing timing at the time of engine high load operation without regard as to the engine load. As the engine load becomes lower, the throttle valve 17 is closed. That is, at this time, control of the amount of intake air by the variable valve timing mechanism B is switched to control of the amount of intake air by the throttle valve 17.

Next, referring to FIG. 11, a first embodiment of a detection device for detecting the mechanical compression ratio will be explained. If referring to FIG. 11, the detection device 100 is provided with a detection sensor 101 which detects the mechanical compression ratio and which generates an output signal showing the detected mechanical compression ratio. In the embodiment shown in FIG. 11, this detection sensor 101 is comprised of a variable resistor which is comprised of a strip-shaped resistance member 102 and a metal slider 103 which slides on this strip-shaped resistance member 102. The strip-shaped resistance member 102 is formed on a support 104 made of an insulating material which is attached to the cylinder block 2. The root part of the slider 103 is supported by the support 105 made of the insulating material attached to the crank case 1.

Figure 11:
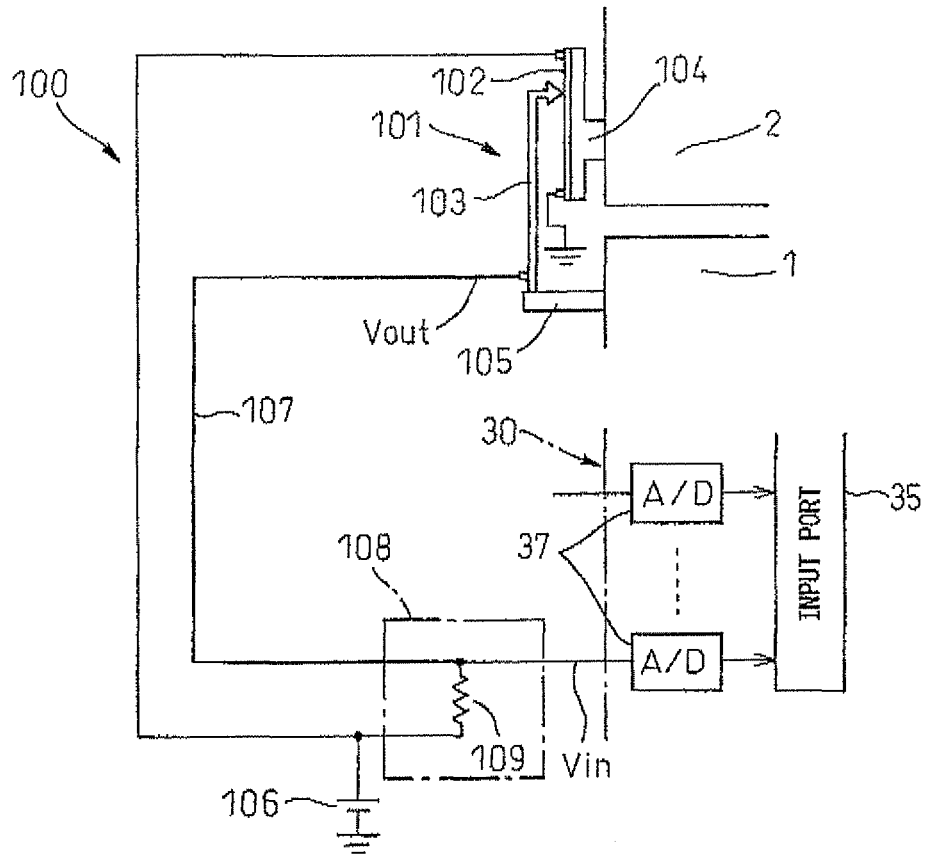
FIG. 11 is a view showing a detection device.

In the first embodiment shown in FIG. 11, the end of the strip-shaped resistance member 102 at the side close to the crank case 1 is grounded, while the end of the strip-shaped resistance member 102 at the side away from the crank case 1 is supplied with the power source voltage 5(v) of the power source 106. On the other hand, the slider 103 is connected through the signal line 107 and input signal switching means 108 to the AD converter 37 of the electronic control unit 30. The input signal switching means 108 is provided with a resistor 109 which has a far higher resistance value than even the strip-shaped resistance member 102. One end of this resistor 109 is connected to the signal line 107. The other end of this resistor 109 is supplied with a 5(v) power source voltage.

Figure 12:
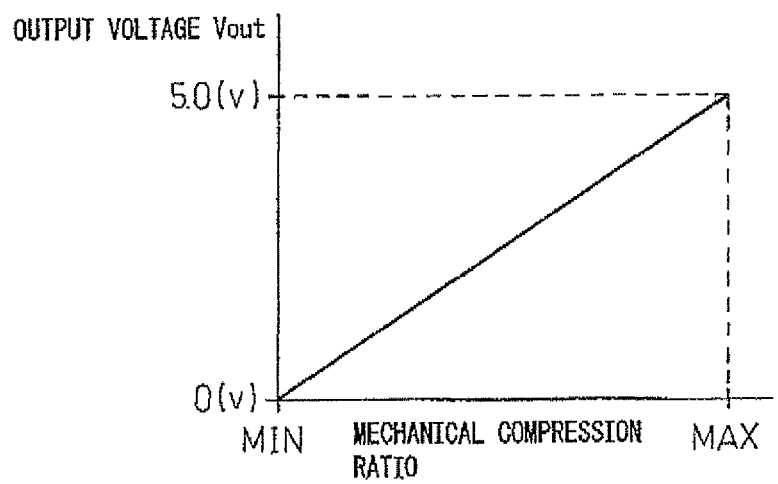
FIG. 12 is a view showing the relationship between the mechanical compression ratio and an output voltage of a detection sensor.

In FIG. 11, if the crank case 1 and the cylinder block 2 become close, the combustion chamber 2 becomes smaller in volume and the mechanical compression ratio rises. On the other hand, in FIG. 11, if the crank case 1 and the cylinder block 2 become closer, the voltage of the signal line 107, that is, the output voltage of the detection sensor 101, increases. FIG. 12 shows the relationship between the mechanical compression ratio and the output voltage Vout of the detection sensor 101 in this first embodiment. As shown in FIG. 12, in this first embodiment, the output voltage Vout of the detection sensor 101 increases along with an increase in the mechanical compression ratio. Furthermore, this output voltage Vout of the detection sensor 101 becomes 0(v) when the mechanical compression ratio is the minimum mechanical compression ratio MIN and becomes the power source voltage of 5(v) when the mechanical compression ratio is the maximum mechanical compression ratio MAX.

The output voltage Vout of the detection sensor 10 is input to the electronic control unit 30 as an input signal showing the detected mechanical compression ratio which is detected by the detection sensor 101. Based on this input signal, the drive motor 59 is controlled so that the mechanical compression ratio becomes the target mechanical compression ratio. That is, based on this input signal, the drive motor 59 lowers the mechanical compression ratio when the detected mechanical compression ratio is higher than the target mechanical compression ratio and increases the mechanical compression ratio when the detected mechanical compression ratio is lower than the target mechanical compression ratio by feedback control.

If an abnormality occurs in the detection device 100 in such a state, in the present invention, the mechanical compression ratio is lowered toward the minimum mechanical compression ratio, so the input signal showing the detected mechanical compression ratio is switched to an input signal showing a predetermined mechanical compression ratio of a high compression ratio side. In this, case, in the embodiment shown in FIG. 11, the detected mechanical compression ratio is switched to the input signal showing the maximum mechanical compression ratio, whereby the mechanical compression ratio is lowered to the minimum mechanical compression ratio. Next, this will be explained with reference to FIG. 13.

Figure 13:
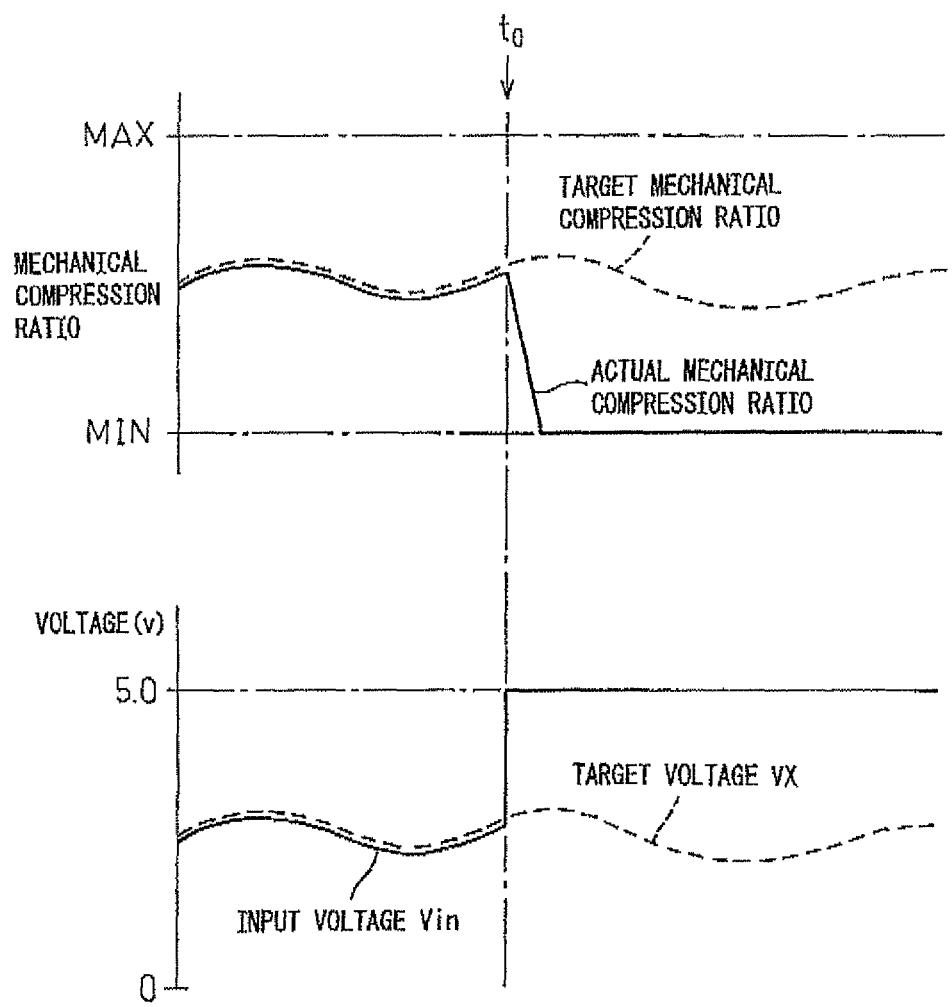
FIG. 13 is a time chart for explaining changes in an actual mechanical compression ratio.

FIG. 13 shows the changes in the target mechanical compression ratio and the actual mechanical compression ratio and the changes in the input voltage Vin which is input from the detection sensor 101 to the electronic control unit 30 and the target voltage VX. This target voltage VX shows the value of the input voltage Vin when the mechanical compression ratio becomes the target mechanical compression ratio. Note that, in FIG. 13, $t_0$ shows the time when an abnormality occurs in the detection device 100, for example, in FIG. 1 or FIG. 11, when the signal line 107 breaks between the detection sensor 101 and the input signal switching means 108. As shown in FIG. 13, before the signal line 107 breaks, the drive motor 59 is controlled so that the input signal Vin becomes the target voltage VX. At this time, the actual mechanical compression ratio is controlled to become the target mechanical compression ratio.

On the other hand, as will be understood from FIG. 11, if the signal line 107 breaks between the detection sensor 101 and the input signal switching means 108, the input voltage Vin rises to the power source voltage of 5(v). Therefore, as will be understood from FIG. 12, at this time, the input voltage Vin shows that the mechanical compression ratio is the maximum mechanical compression ratio MAX. If the input voltage Vin rises to the power source voltage of 5(v), as shown in FIG. 13, the input voltage via becomes higher than the target voltage VX. This shows that the mechanical compression ratio becomes higher than the target mechanical compression ratio. Therefore, at this time, the drive motor 59 is driven so as to lower the mechanical compression ratio, thus, as shown in FIG. 13, if the signal line 107 breaks, the actual mechanical compression ratio is lowered to the minimum mechanical compression ratio.

In this way, in this first embodiment, if the signal line 107 breaks, the input voltage Vin is raised. Therefore, in the first embodiment, the input signal switching means 108 is comprised of a pullup circuit which pulls up the input voltage Vin when the signal line 107 breaks. Note that, in this first embodiment, at this time, the input voltage Vin is pulled up by the pullup circuit to a voltage showing the maximum mechanical compression ratio.

On the other hand, in FIG. 11, when the ground wire of the strip-shaped resistance member 102 breaks or the slider 103 and the strip-shaped resistance member 102 poorly contact each other and the slider 103 separates from the strip-shaped resistance member 102, the input voltage Vin rises. That is, when an abnormality occurs in the detection circuit 100, the input voltage Vin is pulled up by the pullup circuit whereby the actual mechanical compression ratio is lowered to the minimum mechanical compression ratio.

Figure 14:
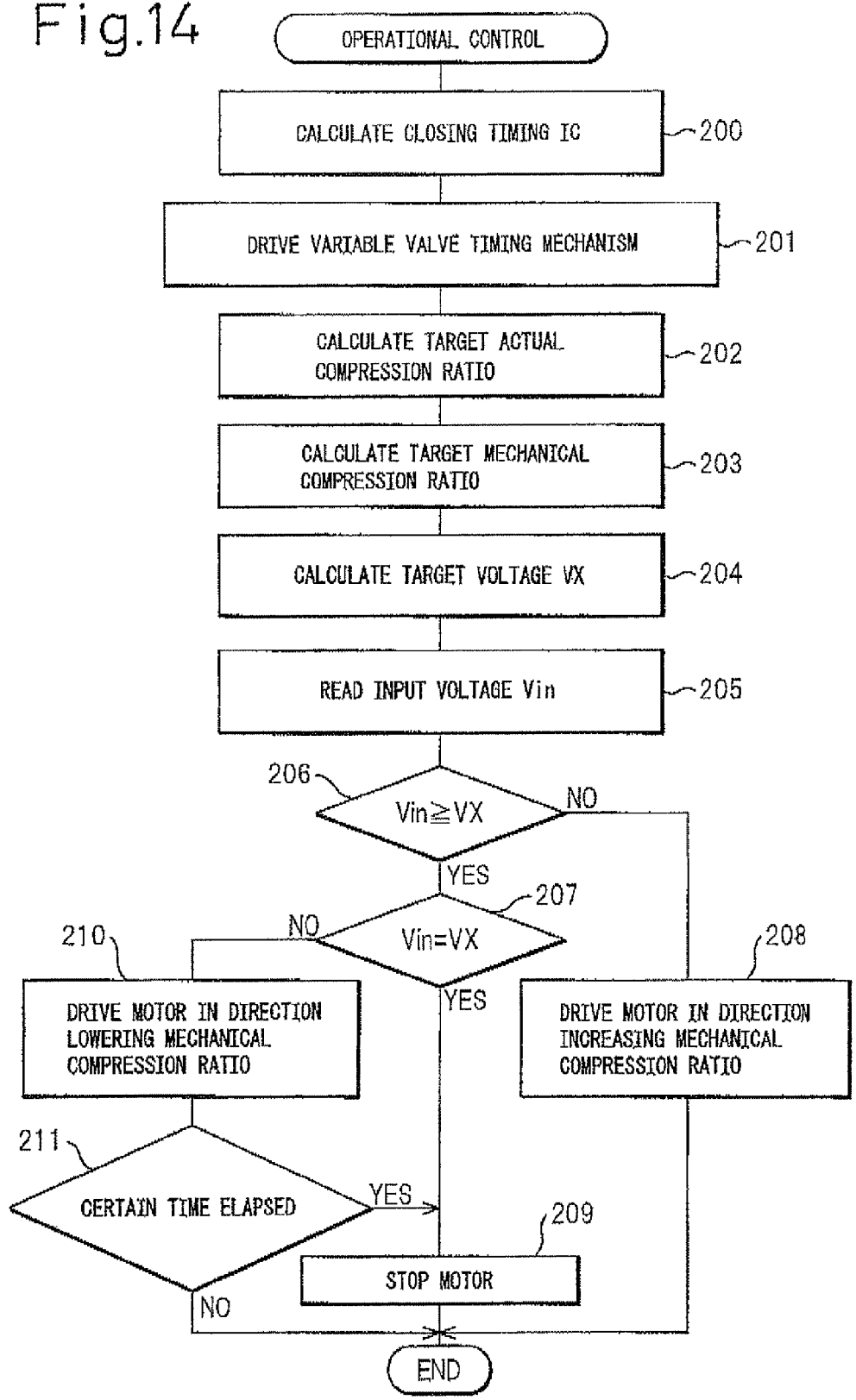
FIG. 14 is a flowchart for operational control.

FIG. 14 shows the operational control routine for working the first embodiment. This routine is executed by interruption every predetermined time interval.

Figure 15:
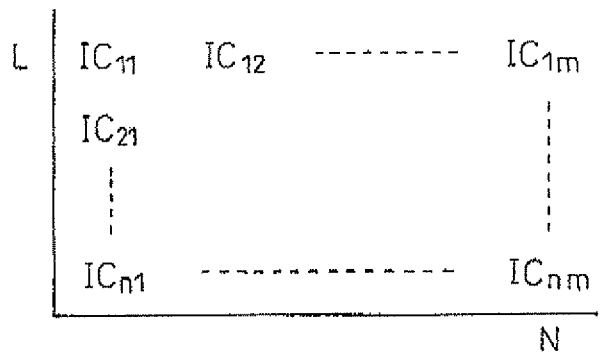
FIG. 15 is a view showing a map of a target closing timing of an intake valve.

Referring to FIG. 14, first, at step 200, the target closing timing IC of the intake valve 7 is calculated. This target closing timing IC is stored as a function of the engine load L and engine speed in the form of a map such as shown in FIG. 15 in advance in the ROM 32. Next, at step 201, the variable valve timing mechanism B is driven so that the closing timing of the intake valve 7 becomes the target closing timing IC. Next, at step 202, the target actual compression ratio is calculated. Next, at step 203, the target mechanical compression ratio by which the actual compression ratio becomes the target actual compression ratio is calculated. Next, at step 204, the target voltage VX which shows the target mechanical compression ratio is calculated. Next, at step 205, the input voltage Vin is read, then the routine proceeds to step 206.

At step 206, it is judged if the input voltage Vin is higher than the target voltage VX. When Vin<VX, it is judged that the mechanical compression ratio is lower than the target mechanical compression ratio. At this time, the routine proceeds to step 208 where the drive motor 59 is driven in a direction increasing the mechanical compression ratio. As opposed to this, when Vin≥VX, the routine proceeds to step 207 where it is judged if Vin=VX. When Vin=VX, the routine proceeds to step 209 where the drive operation of the drive motor 59 is stopped. On the other hand, when Vin is not equal to VX, that is, when Vin>VX, it is judged that the mechanical compression ratio is higher than the target mechanical compression ratio. At this time, the routine proceeds to step 210, wherein the drive motor 59 is driven in a direction lowering the mechanical compression ratio.

Next, at step 211, it is judged if, when the drive motor 59 is driven in a direction lowering the mechanical compression ratio, the rotation drive signal of the drive motor 59 is issued continuously for a certain period or more. When the rotation drive signal of the drive motor 59 is issued for a certain period or more, the routine proceeds to step 209 where the drive operation of the drive motor 29 is stopped. Note that, this certain period is set to a period wherein no matter what the mechanical compression ratio when the signal line 107 breaks, the mechanical compression ratio can be lowered to the minimum mechanical compression ratio.

Next, referring to FIG. 16, a second embodiment of a detection device for detecting the mechanical compression ratio will be explained. In this second embodiment as well, the detection sensor 101 is comprised of a variable resistor comprised of a strip-shaped resistance member 102 and a metal slider 103 which slides on this strip-shaped resistance member 102. However, in this second embodiment, unlike the first embodiment, the end of the strip-shaped resistance member 102 at the side away from the crank case 1 is grounded, while the end of the strip-shaped resistance member 102 at the side close to the crank case 1 is supplied with the power source voltage 5(v) of the power source 106. Therefore, in this second embodiment, the output voltage Vout of the detection sensor 101, as shown in FIG. 17, decreases along with an increase of the mechanical compression ratio. Furthermore, this output voltage Vout of the detection sensor 101 becomes 0(v) when the mechanical compression ratio is the maximum mechanical compression ratio MAX and becomes the 5(v) power source voltage when the mechanical compression ratio is the minimum mechanical compression ratio MIN.

Figure 16:
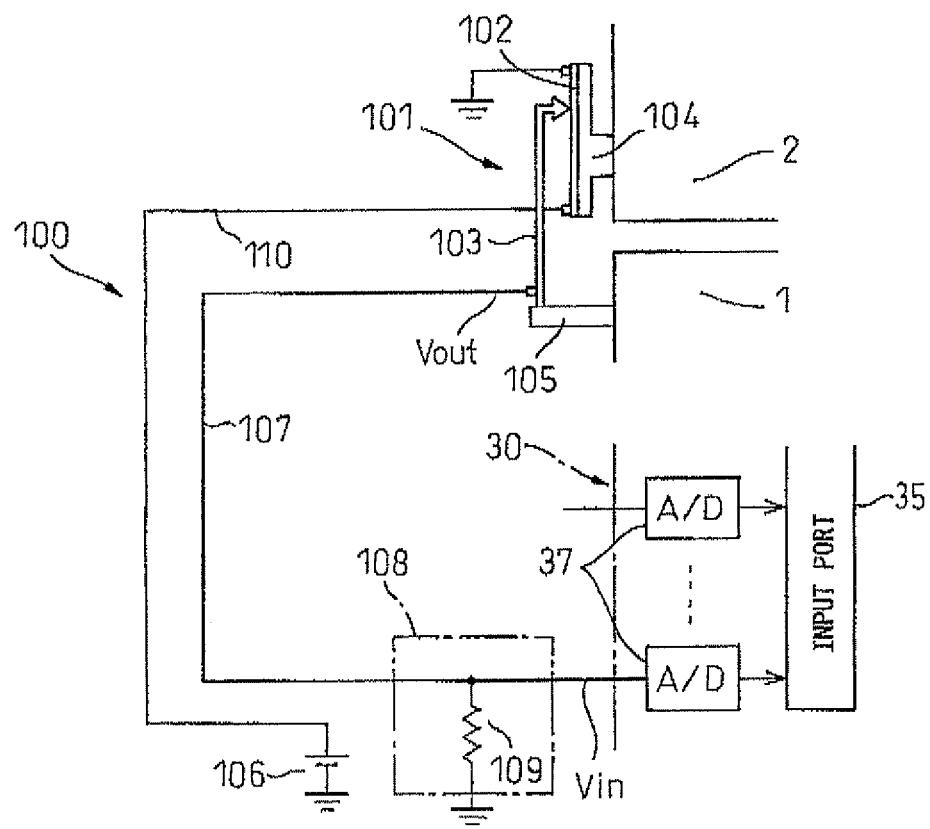
FIG. 16 is a view showing a detection device.

On the other hand, as shown in FIG. 16, in this second embodiment as well, the input signal switching means 108 is provided with the resistor 109 having a far higher resistance value than the strip-shaped resistance member 102. One end of this resistor 109 is connected to the signal line 107. However, in this second embodiment, unlike in the first embodiment, the other end of the resistor 109 is grounded. In this second embodiment as well, the output voltage Vout of the detection sensor 10 is input to the electronic control unit 30 as an input signal showing the detected mechanical compression ratio detected by the detection sensor 101. Based on this input signal, the drive motor 59 lowers the mechanical compression ratio when the detected mechanical compression ratio is higher than the target mechanical compression ratio and increases the mechanical compression ratio when the detected mechanical compression ratio is lower than the target mechanical compression ratio by feedback control.

If an abnormality occurs in the detection device 100 in this state, in this second embodiment as well, the mechanical compression ratio is lowered toward the minimum mechanical compression ratio by the input signal showing the detected mechanical compression ratio being switched to the input signal showing the high compression ratio side predetermined mechanical compression ratio. In this case, in the embodiment shown in FIG. 16, the detected mechanical compression ratio is switched to the input signal showing the maximum mechanical compression ratio, whereby the mechanical compression ratio is lowered to the minimum mechanical compression ratio. Next, this will be explained while referring to FIG. 18.

This FIG. 18 is a view similar to the view shown in FIG. 13. In FIG. 18, $t_0$ shows when an abnormality has occurred in the detection device 100, for example, in FIG. 1 or FIG. 11, when the signal line 107 breaks between the detection sensor 101 and the input signal switching means 108.

As will be understood from FIG. 18, if the signal line 107 breaks, the input voltage Vin will fall to 0(v). Therefore, as will be understood from FIG. 17, at this time, the input voltage Vin shows that the mechanical compression ratio is the maximum mechanical compression ratio MAX. If the input voltage Vin falls to 0(v), as shown in FIG. 18, the input voltage Vin becomes lower than even the target voltage VX. This fact shows that the mechanical compression ratio is becoming higher than the target mechanical compression ratio. Therefore, at this time, the drive motor 59 is driven so as to lower the mechanical compression ratio, thus, as shown in FIG. 18, if the signal line 107 breaks, the actual mechanical compression ratio is lowered to the minimum mechanical compression ratio.

In this way, in this second embodiment, if the signal line 107 breaks, the input voltage Vin is lowered. Therefore, in the second embodiment, the input signal switching means 108 is comprised of a pulldown circuit for pulling down the input voltage Vin when the signal line 107 breaks. Note that, in this second embodiment, at this time, the input voltage Vin is pulled down by the pulldown circuit to a voltage showing the maximum mechanical compression ratio.

On the other hand, in this second embodiment, not only when the slider 103 and the strip-shaped resistance member 102 contact each other poorly and the slider 103 separates from the strip-shaped resistance member 102, but also when the power line 110 which extends from the strip-shaped resistance member 102 to the power source 106 breaks, the input voltage Vin falls to 0(v). That is, in this second embodiment, if either of the signal line 107 or the power line 110 breaks, the input voltage Vin is pulled down by the pulldown circuit whereby the actual mechanical compression ratio is lowered to the minimum mechanical compression ratio.

Figure 19:
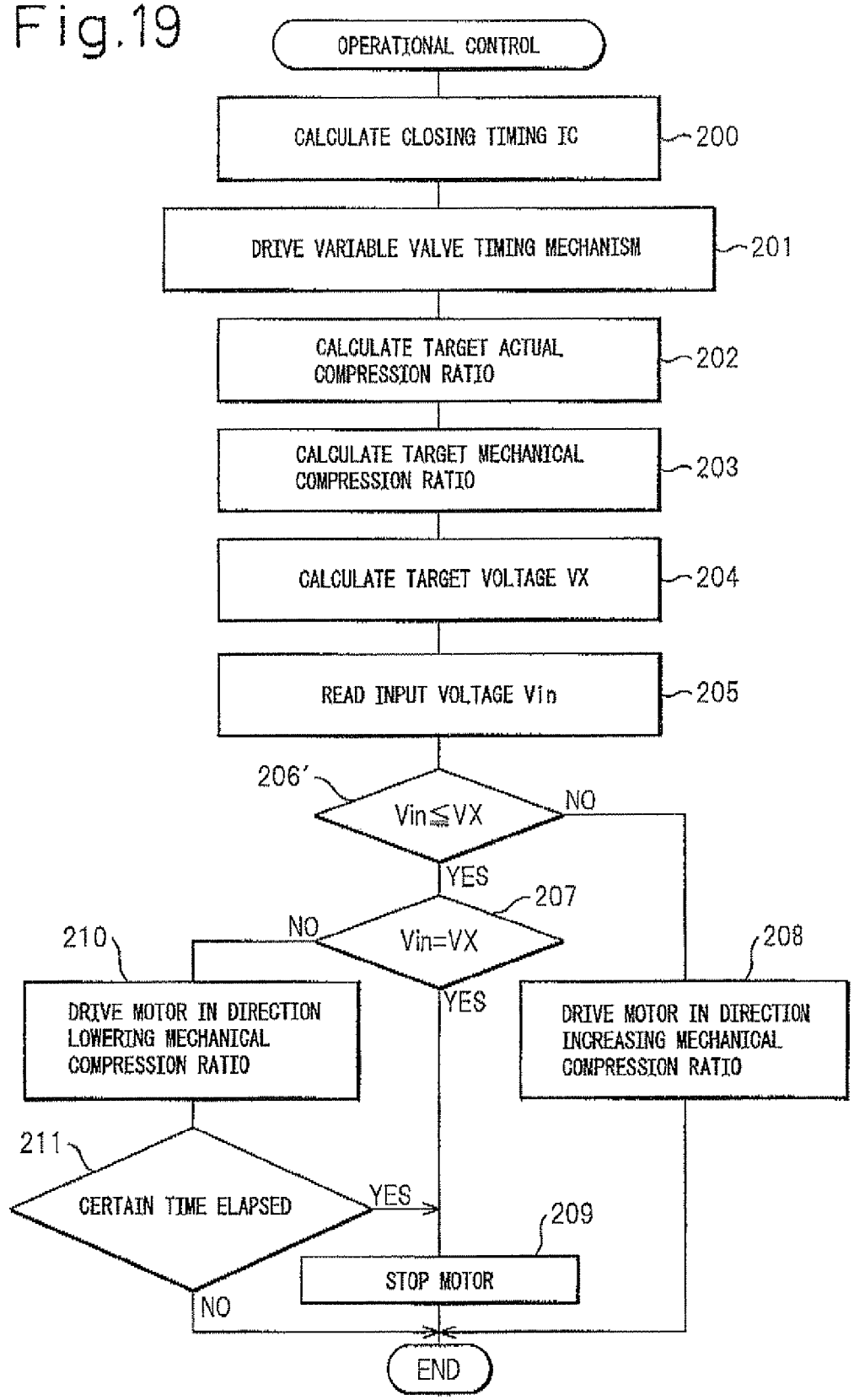
FIG. 19 is a flowchart for operational control.

FIG. 19 shows the operational control routine for working the second embodiment. This routine is also executed by interruption every predetermined time interval. In this routine, the only difference from the routine shown in FIG. 14 is step 206'. The rest of the steps are completely the same as the steps shown in FIG. 14. Therefore, in the routine shown in FIG. 19, the explanations of step 200 to step 205 will be omitted and only the routine from step 206' on will be simply explained.

That is, in step 206', it is judged if the input voltage Vin is lower than the target voltage VX. When Vin>VX, it is judged that the mechanical compression ratio is lower than the target mechanical compression ratio. At this time, the routine proceeds to step 208 where the drive motor 59 is driven in a direction increasing the mechanical compression ratio. As opposed to this, when Vin≤VX, the routine proceeds to step 207 where it is judged if Vin=VX. When Vin=VX, the routine proceeds to step 209 where the drive operation of the drive motor 59 is stopped. On the other hand, when Vin is not equal to VX, that is, when Vin<VX, it is judged that the mechanical compression ratio is higher than the target mechanical compression ratio. At this time, the routine proceeds to step 210 where the drive motor 59 is driven in a direction lowering the mechanical compression ratio.

Next, at step 211, when the drive motor 59 has been driven in a direction lowering the mechanical compression ratio, it is judged if the rotation drive signal of the drive motor 59 has been issued continuously for a certain period or more. When the rotation drive signal of the drive motor 59 has been issued continuously for a certain period or more, the routine proceeds to step 209 where the drive operation of the drive motor 29 is stopped.

Note that, in both embodiments of the first embodiment and second embodiment, the mechanical compression ratio is controlled by the drive motor 55 based on the output signal of the electronic control unit 30. Therefore, in these embodiments, the electronic control unit 30 and the drive motor 59 constitute a compression ratio control device which controls the mechanical compression ratio.

Further, in these embodiments, if expressed using this compression ratio control device, the output signal of the detection sensor 101 is input to the compression ratio control device as an input signal showing the detected mechanical compression ratio detected by the detection sensor 101. This compression ratio control device lowers the mechanical compression ratio when the detected mechanical compression ratio is higher than the target mechanical compression ratio and increases the mechanical compression ratio when the detected mechanical compression ratio is lower than the target mechanical compression ratio.

Furthermore, in these embodiments, when an abnormality arises in the detection device 100, regardless of the output signal of the detection sensor 101, the input signal is switched by the input signal switching means 108 to an input signal showing a predetermined mechanical compression ratio of the high compression ratio side. Due to this input signal switching action, the mechanical compression ratio is lowered toward the minimum mechanical compression ratio. In this case, in the first embodiment and the second embodiment, the above-mentioned predetermined mechanical compression ratio is made the maximum mechanical compression ratio.

Further, in the embodiments shown in FIG. 11 and FIG. 16, as the detection sensor 101, a variable resistance type sensor is used. However, as this detection sensor 101, a noncontact sensor using differential transistors or Hall elements or other various types of sensors may be used.

The invention claimed is:

1. A control system of an internal combustion engine comprising:
   a variable compression ratio mechanism able to change a mechanical compression ratio;
   a variable valve timing mechanism able to control a closing timing of an intake valve; the closing timing of the intake valve approaching an intake bottom dead center as an engine load becomes higher,
   a detection device for detecting the mechanical compression ratio; and
   a compression ratio control device controlling the mechanical compression ratio on the basis of the mechanical compression ratio detected by the detection device; wherein
   when an abnormality occurs in the detection device, the mechanical compression ratio is lowered to a minimum mechanical compression ratio, the closing timing of the intake valve is fixed to a closing timing at the time of an engine high load operation, and control of an amount of intake air by the variable valve timing mechanism is switched to control of an amount of intake air by a throttle valve, said detection device is provided with a detection sensor which detects the mechanical compression ratio and generates an output signal which shows the detected mechanical compression ratio, said compression ratio control device receives an output signal of said detection sensor as an input signal showing said detected mechanical compression ratio and, based on said input signal, lowers the mechanical compression ratio when said detected mechanical compression ratio is higher than a target mechanical compression ratio and increases the mechanical compression ratio when said detected mechanical compression ratio is lower than the target mechanical compression ratio;

said control system is provided with input signal switching means for switching said input signal to an input signal indicating a predetermined mechanical compression ratio of a high compression ratio side regardless of the output signal of the detector sensor when an abnormality occurs in said detection device; and due to this input signal switching action, the mechanical compression ratio is lowered toward the minimum mechanical compression ratio.

2. A control system of an internal combustion engine as claimed in claim 1, wherein said predetermined mechanical compression ratio is a maximum mechanical compression ratio.

3. A control system of an internal combustion engine as claimed in claim 1, wherein said detection sensor generates an output voltage which increases along with an increase of the detected mechanical compression ratio, said output voltage is conveyed over a signal line to said compression ratio control device and input as said input signal, and said input signal switching means is comprised of a pullup circuit for pulling up a voltage which is input as said input signal when said signal line breaks.

4. A control system of an internal combustion engine as claimed in claim 3, wherein when said signal line breaks, the voltage which is input as said input signal is pulled up by the pullup circuit to a voltage showing a maximum mechanical compression ratio.

5. A control system of an internal combustion engine as claimed in claim 1, wherein said detection sensor generates an output voltage which decreases along with an increase of the detected mechanical compression ratio, said output voltage is conveyed over a signal line to said compression ratio control device and input as said input signal, and said input signal switching means is comprised of a pull-down circuit for pulling down a voltage which is input as said input signal when said signal line breaks.

6. A control system of an internal combustion engine as claimed in claim 5, wherein when said signal line breaks, the voltage which is input as said input signal is pulled down by the pulldown circuit to a voltage showing a maximum mechanical compression ratio.

* * * * *